2 Sheets--Sheet 1.

G. G. CROWLEY.
Clothes-Frame.

No. 167,072.   Patented Aug. 24, 1875.

Witnesses:
Charles C. Gill
Jno. P. Jacobs

Inventor:
George G. Crowley
by his Atty's
Cox and Cox

2 Sheets--Sheet 2.

G. G. CROWLEY.
Clothes-Frame.

No. 167,072. Patented Aug. 24, 1875.

Witnesses:
Chas. C. Gill
Jno. P. Jacobs

Inventor:
George G. Crowley
by his Attys.
Cox and Cox

UNITED STATES PATENT OFFICE.

GEORGE G. CROWLEY, OF SOMERVILLE, NEW YORK.

IMPROVEMENT IN CLOTHES-FRAMES.

Specification forming part of Letters Patent No. 167,072, dated August 24, 1875; application filed February 11, 1875.

*To all whom it may concern:*

Be it known that I, GEORGE G. CROWLEY, of Somerville, St. Lawrence county, New York, have invented a new and useful Improvement in Clothes-Driers, of which the following is a specification, reference being had to the accompanying drawings.

The invention relates to an improved clothes-drier, as shown in the accompanying drawings, and hereinafter particularly described.

Figure 1:
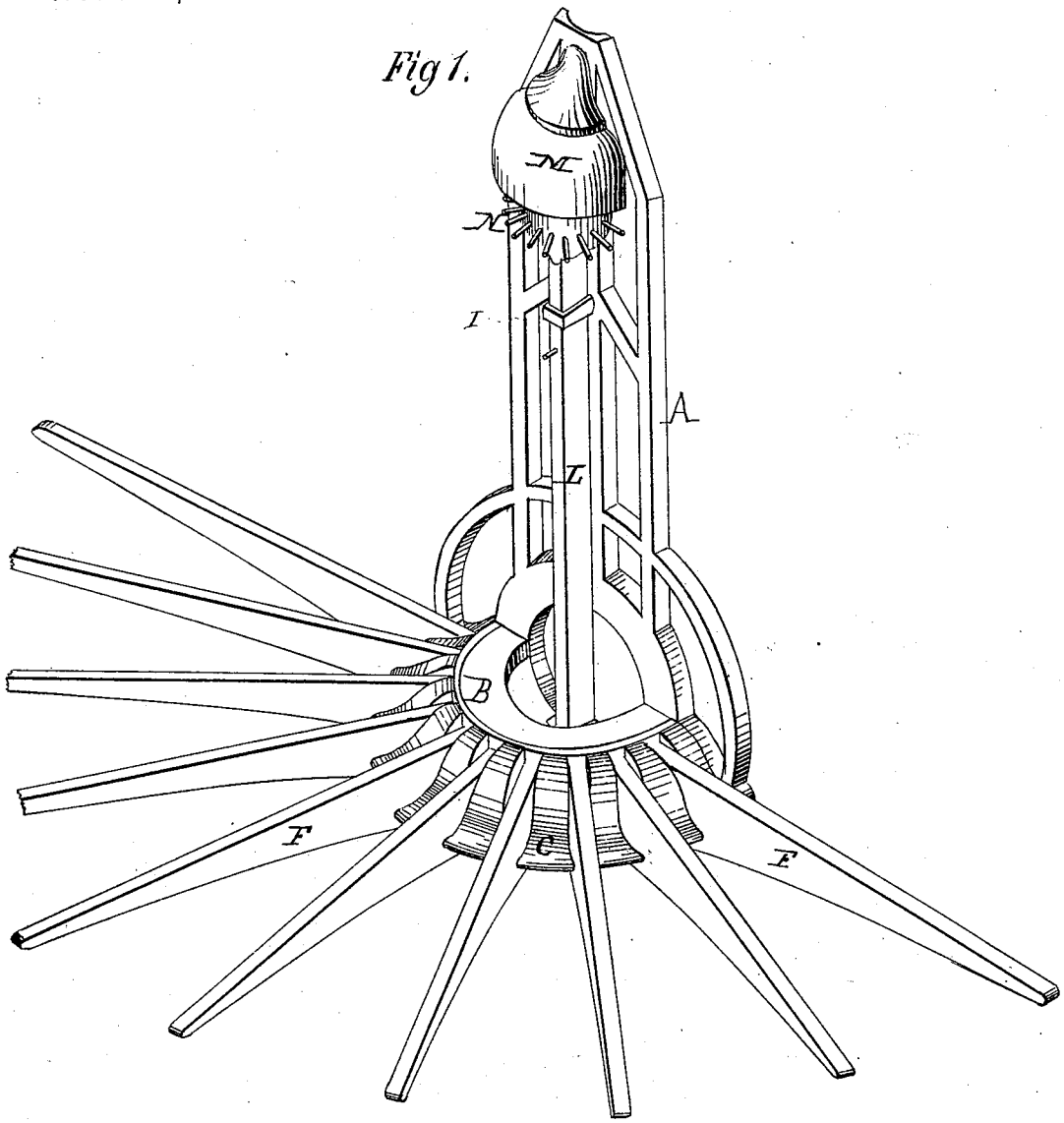
Figure 2:
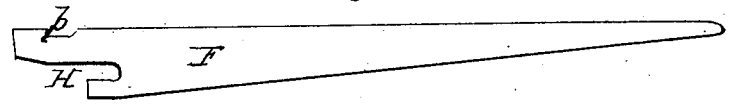
Figure 3:
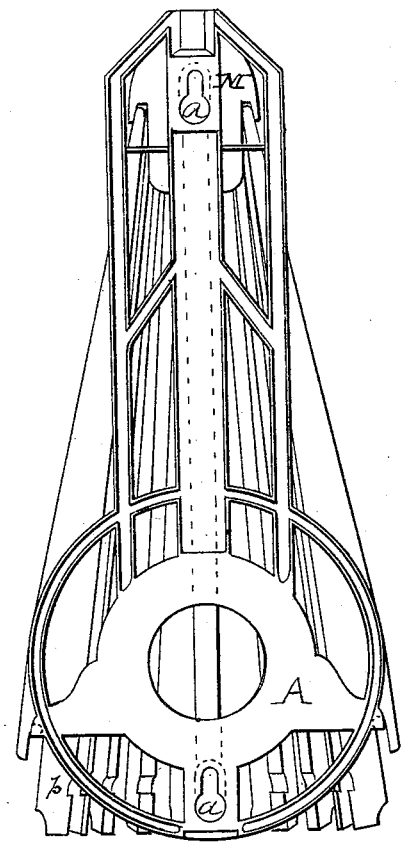
Figure 4:
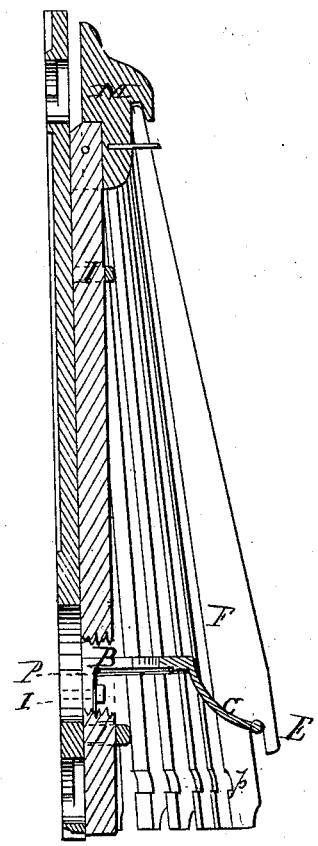

Figure 1 is a front view of a device embodying the invention; Fig. 2, a detached view of one of the arms. Fig. 3 is a rear view of the same. Fig. 4 is a side view.

A in the accompanying drawings is a frame, of iron or other suitable material, provided near each end with the apertures $a$, of the shape shown, so that the frame may be readily secured upon or removed from a wall. On the outer side of the frame A, near its lower extremity, is placed the convex ledge B, having upon it the downward and outward depending plates C, which are properly separated and their lower edges connected by the circular ledge E, upon which are placed the arms F, tapering from bottom to top, and provided on their inner lower portions with the slot H, the upper portion of which forms a circular aperture of such size as to turn readily on the ledge E, while the mouth of the slot is properly contracted to such dimensions as that, by decided pressure, the ledge E can be forced through it into the aperture, but not withdrawn therefrom without some strain. The lower ends of the arms F extend so far beyond the recess that their extremities come in contact with the lower surface of the ledge B, thus sustaining the arms in a horizontal position, and radiating from the ledge B as a center. At the upper and lower portions of the frame A are secured the guides I, in which moves the sliding bar L, provided at its upper end with the cap M, the lower portion of which is reduced, and provided with the radiating pegs N, between which the upper ends of the arms F enter when elevated to an upright position. The upper part of the cap M is advanced and hollow, so that when the arms are elevated, as aforesaid, it can be slipped over their upper ends, and thus confine them in the said folded position. To release the arms it is only necessary to elevate the cap M.

What I claim as my invention, and desire to secure by Letters Patent, is—

The cap M, constructed as stated, and provided with the pegs N, in combination with the bar L, for the purpose set forth.

In testimony that I claim the foregoing improvement in clothes-driers, as above described, I have hereunto set my hand and seal this 12th day of January, 1875.

GEORGE G. CROWLEY. [L. S.]

Witnesses:
 WM. BARKER,
 CHAS. B. DILLENBECK.